US010721397B2

(12) United States Patent
Ali et al.

(10) Patent No.: US 10,721,397 B2
(45) Date of Patent: Jul. 21, 2020

(54) IMAGE PROCESSING SYSTEM USING PREDEFINED STITCHING CONFIGURATIONS

(71) Applicant: Caterpillar Inc., Peoria, IL (US)

(72) Inventors: Hassan Ali, Peoria, IL (US); Douglas Jay Husted, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 15/254,756

(22) Filed: Sep. 1, 2016

(65) Prior Publication Data

US 2018/0063427 A1  Mar. 1, 2018

(51) Int. Cl.
*H04N 5/232* (2006.01)
*B60R 1/00* (2006.01)
*H04N 7/18* (2006.01)
*G06T 3/40* (2006.01)
*G06T 7/30* (2017.01)
*H04N 5/247* (2006.01)
*E02F 9/26* (2006.01)

(52) U.S. Cl.
CPC .......... *H04N 5/23238* (2013.01); *B60R 1/00* (2013.01); *G06T 3/4038* (2013.01); *G06T 7/30* (2017.01); *H04N 5/23293* (2013.01); *H04N 7/181* (2013.01); *B60R 2300/105* (2013.01); *B60R 2300/303* (2013.01); *B60R 2300/607* (2013.01); *E02F 9/261* (2013.01); *H04N 5/247* (2013.01)

(58) Field of Classification Search
CPC ........ B60R 2300/105; B60R 2300/303; B60R 2300/607

USPC ........................................................ 348/148
See application file for complete search history.

(56) References Cited

U.S. PATENT DOCUMENTS

| 9,279,882 B2 | 3/2016 | Hukkeri et al. | |
|---|---|---|---|
| 9,349,157 B2 | 5/2016 | Gillard et al. | |
| 2005/0206224 A1* | 9/2005 | Lu | B60T 7/12 303/7 |
| 2010/0171828 A1* | 7/2010 | Ishii | B60R 1/00 348/135 |
| 2014/0085472 A1* | 3/2014 | Lu | B60R 1/002 348/148 |
| 2014/0184799 A1 | 7/2014 | Kussel | |

(Continued)

FOREIGN PATENT DOCUMENTS

| DE | 102013017341 | 6/2014 |
|---|---|---|
| WO | WO 2013/019707 | 2/2013 |

*Primary Examiner* — Jeremiah C Hallenbeck-Huber
(74) *Attorney, Agent, or Firm* — Finnegan, Henderson, Farabow, Garrett & Dunner, LLP (57) ABSTRACT

An image processing system is disclosed for a mobile machine. The system may include a plurality of cameras mounted on the machine and configured to capture image data of an environment around the machine. The system may further include a display and a processing device. The processing device may obtain information indicative of a current position of at least one camera relative to the machine. Based on the obtained information, the processing device may select a stitching configuration out of a plurality of predefined stitching configurations. The processing device may use the selected stitching configuration to generate a surround-view image of the environment around the machine. Thereafter, the processing device may also render the surround-view image on the display.

15 Claims, 5 Drawing Sheets

(56) References Cited

U.S. PATENT DOCUMENTS

| | | | |
|---|---|---|---|
| 2014/0267688 A1* | 9/2014 | Aich | H04N 7/181 |
| | | | 348/113 |
| 2014/0358424 A1* | 12/2014 | Lavoie | G01C 21/3676 |
| | | | 701/428 |
| 2014/0358429 A1* | 12/2014 | Shutko | G01C 21/3647 |
| | | | 701/458 |
| 2015/0049193 A1 | 2/2015 | Gupta et al. | |
| 2016/0049020 A1* | 2/2016 | Kuehnle | G07C 5/0808 |
| | | | 701/34.4 |
| 2016/0088287 A1 | 3/2016 | Sadi et al. | |
| 2016/0366336 A1* | 12/2016 | Kuehnle | H04N 5/23238 |
| 2017/0006221 A1* | 1/2017 | Cheng | H04N 5/23238 |

* cited by examiner

| Stitching Configuration | First Camera | | | | | | | | ... | Second Camera | | | | | | | | ... | Nth Camera |
|---|---|---|---|---|---|---|---|---|---|---|---|---|---|---|---|---|---|---|---|
| | Δ Yaw (degrees) | | | | Δ Pitch (degrees) | | | | | Δ Yaw (degrees) | | | | Δ Pitch (degrees) | | | | | |
| | 0 | 1-3 | 4-7 | 8-12 | 0 | 1-3 | 4-7 | 8-12 | | 0 | 1-3 | 4-7 | 8-12 | 0 | 1-3 | 4-7 | 8-12 | | |
| Default | x | | | | x | | | | | x | | | | x | | | | | |
| 1 | | x | | | x | | | | | x | | | | x | | | | | |
| 2 | | | x | | x | | | | | x | | | | x | | | | | |
| 3 | x | | | | | | x | | | x | | | | x | | | | | |
| 4 | | x | | | x | | | | | | x | | | x | | | | | |
| ... | | | | | | | | | | | | | | | | | | | |
| N | | | x | | | | x | | | | | x | | | | x | | | |

IMAGE PROCESSING SYSTEM USING PREDEFINED STITCHING CONFIGURATIONS

TECHNICAL FIELD

This disclosure relates generally to image processing systems and methods and, more particularly, to image processing systems and methods for generating a surround-view image using predefined stitching configurations.

BACKGROUND

Various machines such as excavators, scrapers, articulated trucks and other types of heavy equipment are used to perform a variety of tasks. Some of these tasks involve moving large, awkward, and heavy loads in a small environment. Because of the size of the machines and/or the poor visibility provided to operators of the machines, these tasks can be difficult to complete safely and effectively. For this and other reasons, some of these machines are equipped with image processing systems that provide views of the machines' environments to their operators.

Such image processing systems assist the operators of the machines by increasing visibility, and may be beneficial in situations where the operators' fields of view are obstructed by portions of the machines or other obstacles. Conventional image processing systems include multiple cameras that capture different areas of a machine's environment. The cameras are placed strategically around the machines based on the machines visibility requirements. Individual live video streams from the multiple cameras may then be stitched together to form a partial or complete surround-view of the environment around the machines. Typically, the individual live video streams are stitched in a specific configuration with respect to each unique machine type and model. A single stitching configuration, however, is insufficient in articulated machines having several reference frames. When a single stitching configuration is used while articulated machines move, the changes in the cameras positions may distort the surround-view and even create a blind spot in the surround-view image.

One attempt to account for changes in the positions of the cameras in an image processing system is disclosed in U.S. Patent Publication No. 2014/0184799 (the '799 publication) to Kussel. The system of the '799 publication includes inclination sensors to determine changes from the initial orientations of the cameras. The system of the '799 publication also includes means for using information from the inclination sensors to correct deviations in the cameras' alignment over the life of the image processing system.

While the image processing system of the '799 publication may be used to stitch image data from cameras mounted on articulated machines, it requires separate calculations for each change detected in the inclination sensors. Consequently, huge amount of computations are necessary to account for movement of multiple cameras, as happens almost every time an articulated machine works. This is why the image processing system of the '799 publication fails to provide a real-time surround-view image using an image stitching process that dynamically changes to account for the changes in the cameras' relative positions.

The disclosed methods and systems are directed to solve one or more of the problems set forth above and/or other problems of the prior art.

SUMMARY

In one aspect, the present disclosure is directed to an image processing system for a mobile machine. The image processing system may include a plurality of cameras mounted on the machine and configured to capture image data of an environment around the machine. The image processing system may further include a display mounted on the machine and a processing device in communication with the plurality of cameras and the display. The processing device may be configured to obtain information indicative of a current position of at least one camera relative to the machine. Based on the obtained information, the processing device may be configured to select a stitching configuration out of a plurality of predefined stitching configurations. The processing device may be configured to use the selected stitching configuration to generate a surround-view image of the environment around the machine and to render the surround-view image on the display.

In another aspect, the present disclosure is directed to a method for displaying a surround-view image of an environment around a mobile machine. The method may include capturing image data of the environment around the machine. The method may also include obtaining information indicative of a current position of at least one camera relative to the machine. Based on the obtained information, the method may further include selecting a stitching configuration out of a plurality of predefined stitching configurations. The method may further include using the selected stitching configuration to generate a surround-view image of the environment around the machine, and rendering the surround-view image for display.

In yet another aspect, the present disclosure is directed to a computer readable medium having executable instructions stored thereon for completing a method for displaying a surround-view image of an environment around a mobile machine. The method may include capturing image data of the environment around the machine. The method may also include obtaining information indicative of a current position of at least one camera relative to the machine. Based on the obtained information, the method may further include selecting a stitching configuration out of a plurality of predefined stitching configurations. The method may further include using the selected stitching configuration to generate a surround-view image of the environment around the machine, and rendering the surround-view image for display.

DETAILED DESCRIPTION

Figure 1:
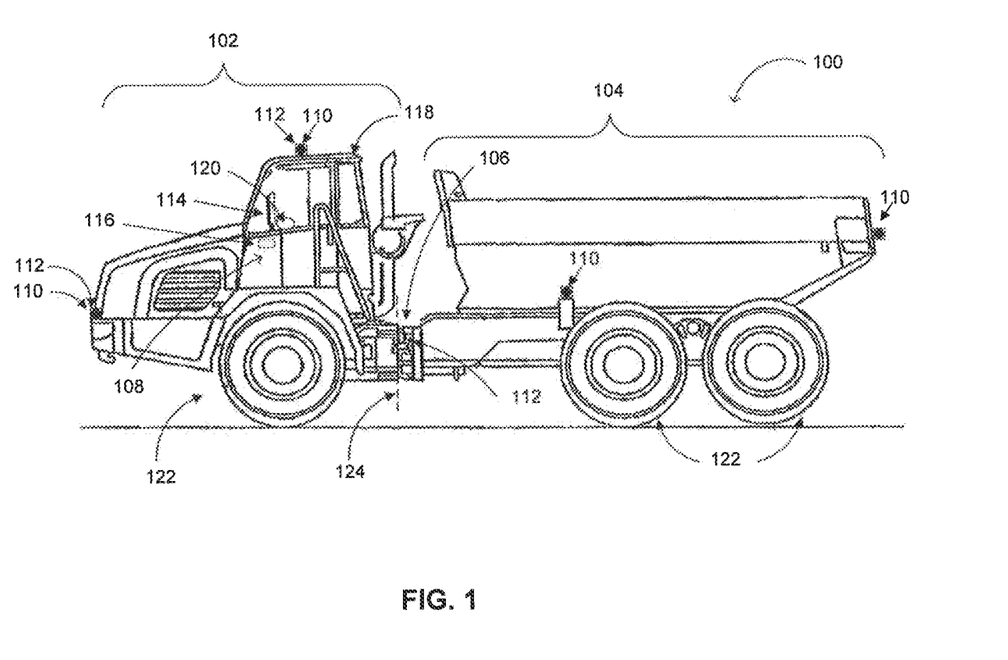
FIG. 1 is a diagrammatic side view illustration of an exemplary articulated truck consistent with the disclosed embodiments.

The present disclosure relates to image processing systems and methods for a mobile machine 100 (hereinafter referred to as "machine 100"). FIG. 1 schematically illustrates an example of machine 100 consistent with the disclosed embodiments. In the example depicted in FIG. 1 machine 100 is an articulated truck. However, machine 100 may embody other types of mobile machines such as an excavator, a scraper, a wheel loader, a motor grader, or any another machine known in the art.

In some embodiments, machine 100 may include a first section 102, a second section 104, an articulation joint 106, and an image processing system 108. Image processing system 108 may include one or more of the following: a plurality of cameras 110, a plurality of sensors 112, a display device 114, and a processing device 116. First section 102 may include multiple components that interact to provide power and control operations of machine 100. In one embodiment, first section 102 may include an operator compartment 118 having therein a navigation device 120 and display device 114. In addition, first section 102 may or may not include at least one ground engaging element 122. In the embodiment depicted in FIG. 1 first section 102 includes wheels, but in other embodiments, e.g., when machine 100 is an excavator, first section 102 may be located above second section 104 and does not touch the ground. Second section 104 may include multiple components tied to the mobility of machine 100. In one embodiment, second section 104 includes ground engaging element 122, for example, wheels.

In some embodiments, machine 100 may include articulation joint 106 that operatively connects first section 102 to second section 104. The term "articulation joint" may include an assembly of components that cooperate to pivotally connect second section 104 to first section 102, while still allowing some relative movements (e.g., bending or rotation) between first section 102 and second section 104. When an operator moves machine 100 by operating navigation device 120, articulation joint 106 allows first section 102 to pivot horizontally and/or vertically relative to second section 104. One skilled in the art may appreciate that the relative movement between first section 102 and second section 104 may exist in any manner.

In some embodiments, image processing system 108 may include a plurality of cameras 110 to capture image data of an environment around machine 100. Cameras 110 may be attached or mounted to any part of machine 100. The term "camera" generally refers to a device configured to capture and record image data, for example, still images, live video streams, time lapse sequences, etc. Camera 110 can be a monochrome digital camera, a high-resolution digital camera, or any suitable digital camera. Cameras 110 may capture image data of the surroundings of machine 100, and transfer the captured image data to processing device 116. In some cases, cameras 110 may capture a complete view of the environment of machine 100. Thus, the cameras 110 may have a 360-degree horizontal field of view. In one embodiment, cameras 110 include at least two cameras mounted on first section 102 and at least two additional cameras 110 mounted on second section 104. For example, the articulated truck of FIG. 1 has six cameras 110 for capturing the environment around it. Not all of the cameras 110 are shown in the figure. The articulated truck illustrated in FIG. 1 includes two cameras 110 mounted on each side, one camera 110 mounted on the front of the articulated truck, and another camera 110 mounted on the back of the articulated truck. Therefore, in this example, machine 100 may include three cameras 110 on first section 102 and three cameras 110 on second section 104.

Sensors 112 may be configured to measure the state of the plurality of cameras 110 during operation of machine 100. The term "sensor" may include any type of sensor or sensor group configured to measure one or more parameter values indicative of, either directly or indirectly, a current position of at least one camera 110 relative to machine 100. Some sensors 112 may be integral with cameras 110 while other sensors 112 may be separated from cameras 110. In the example illustrated in FIG. 1, built-in sensors 112 may be incorporated only with the cameras located on first section 102 for measuring the cameras' orientations, and a separate sensor 112 may be mounted in or near articulation joint 106 for measuring pivot angles of machine 100. In some embodiments, sensors 112 may also determine information indicative of the current position of at least one camera 110 relative to machine 100 based on a data from navigation device 120.

Figure 7:
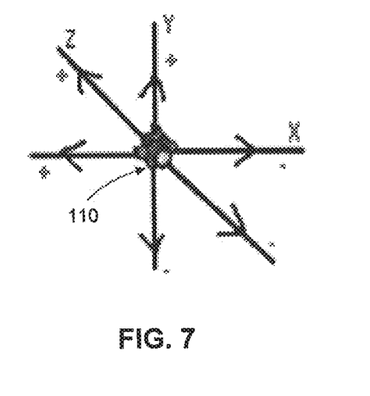
FIG. 7 is a diagrammatic illustration of possible movements of a camera mounted on the articulated truck of FIG. 1.
Figure 8:
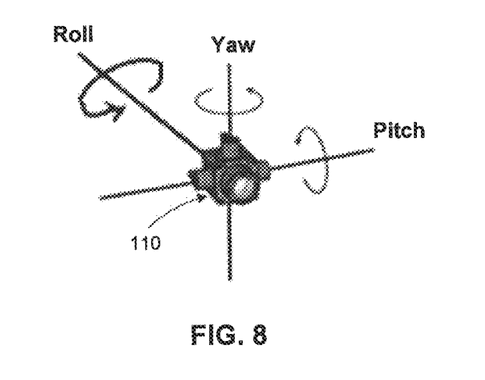
FIG. 8 is a diagrammatic illustration of other possible movements of a camera mounted on the articulated truck of FIG. 1.

Consistent with the present disclosure, sensors 112 may be configured to determine different movements of cameras 110. In one example, sensors 112 may determine the X-Y-Z movement illustrated in FIG. 7. In another example, sensors 112 may determine at least some of the following movements illustrated in FIG. 8:

Yaw movement: a rotation of camera 110 around its vertical axis (top to bottom axis);

Pitch movement: a rotation of camera 110 around its horizontal axis (left to right axis); and Roll movement: a rotation of camera 110 around its longitudinal axis (Front-to-back axis).

One skilled in the art may appreciate that these movements may be either in a negative direction or in a positive direction. For example, a clockwise rotation along the vertical axis may be considered as a positive yaw movement and a counterclockwise rotation along the vertical axis may be considered as a negative yaw movement.

In one embodiment, sensors 112 may measure linear and/or angular acceleration of cameras 110 in a number of predefined directions. In one example, sensors 112 may include a plurality of accelerometers configured to detect acceleration of cameras 110 in at least two (e.g., three) non-collinear directions and determine the orientation of cameras 110 relative to the earth. The information from the plurality of accelerometers may be combined with information from another plurality of accelerometers configured to detect acceleration of first section 102 and/or second section 104 relative to the earth. The information from the accelerometers may be combined with other sensors to determine the current position of at least one camera 110 relative to machine 100.

In another embodiment, sensors 112 may determine information indicative of the current position of at least one camera 110 relative to machine 100 based on the articulation of first section 102 relative to second section 104. The information may include, for example, the current pivot angle state of machine 100. The pivot angle state may include a pivot angle around a vertical axis 124, as well as an pivot angle around a horizontal axis (not shown). The information may also include a current inclination angle of first section 102, a current inclination angle of second section 104, and a current direction of machine 100. In the following disclosure the terms "pivot angle" and "positions of cameras 110" are used interchangeably. By determining the current pivot angle, processing device 116 may estimate the current positions of cameras 110, and by determining the positions of cameras 110, processing device 116 may estimate the current pivot angle. Consistent with the present disclosure, however, there may be added value in having sensors 112 integral with cameras 110, as they may detect a drift in the positions of cameras 110 that occurs over time.

In some embodiments, display device 114 may be mounted on first section 102 of machine 100. The term "display device" refers to one or more devices used to present an output of processing device 116 to the operator of machine 100. Display device 114 may include a single-screen display, such as a Liquid-crystal display (LCD) device, or a multi-screen display. Display device 114 can include multiple displays managed as separate logical displays. Thus, different content can be displayed on the separate displays, although part of the same physical screen. Consistent with disclosed embodiments, display device 114 may be used to display a representation of the environment around machine 100 based on image data captured by cameras 110. In addition, display device 114 can encompass a touch sensitive screen. Thus, display device 114 may have the capability to input data and to record information.

Processing device 116 may be in communication with cameras 110, sensors 112, and display device 114. The term "processing device" may include any physical device having an electric circuit that performs a logic operation on input. For example, processing device 116 may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. In some embodiments, processing device 116 may be associated with a software product stored on a non-transitory computer readable medium and comprising data and computer implementable instructions, which when executed by processing device 116, cause processing device 116 to perform operations. For example, the operations may include displaying a surround-view image to the operator of machine 100. The non-transitory computer readable medium may include a memory, such as RAM, ROM, flash memory, a hard drive, etc. The computer readable memory may also be configured to store electronic data associated with operation of machine 100, for example, image data associated with a certain event.

Figure 2:
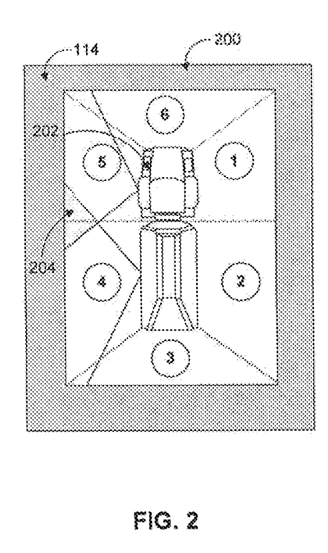
FIG. 2 is a diagrammatic illustration of a display device of the articulated truck of FIG. 1.
Figure 3:
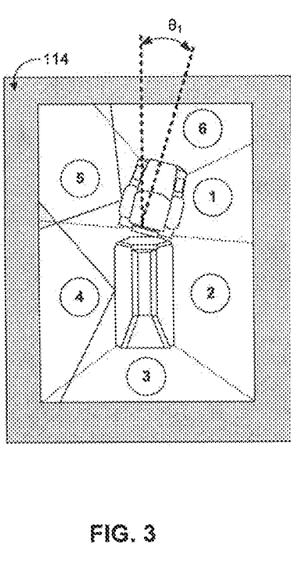
FIG. 3 is a diagrammatic illustration of the same display device when the articulated truck of FIG. 1 turns in a first pivot angle.
Figure 4:
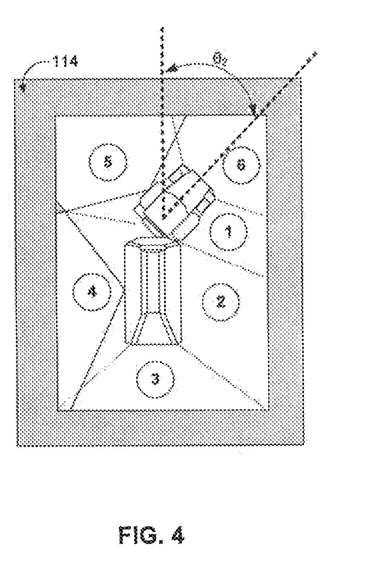
FIG. 4 is a diagrammatic illustration of the same display device when the articulated truck of FIG. 1 turns in a second pivot angle.

Consistent with embodiments of the present disclosure, processing device 116 may be configured to generate a surround-view image of the environment around machine 100 using six wide field of view (FoV) cameras 110 located around machine 100, as illustrated in FIGS. 2-4. To generate a surround-view image, processing device 116 may perform a bird's eye view transformation on the image data captured by cameras 110 and an image stitching process to combine the image data captures by cameras 110.

The bird's eye view transformation utilizes image data captured from different viewpoints to reflect a different vantage point above machine 100. Those of ordinary skill in the art of image processing will recognize that there are numerous methods for performing such transformations. One method includes performing scaled transformation of a captured rectangular image to a trapezoid image to simulate the loss of perspective. The loss of perspective happens because the azimuth angle of the virtual viewpoint is larger than the actual viewpoint of cameras 110 mounted on machine 100. The trapezoid image may result from transforming each row of the x-axis gradually with increased compression starting from the upper edge of the picture frame, with increasing compression towards the bottom of the frame. Additionally, a subsequent image acquired later in time may be similarly transformed to overlap the earlier-acquired image, which can increase the resolution of the trapezoid image.

The image stitching process may be used to merge the trapezoid images originated from cameras 110 to create a 360-degree surround-view image of the actual environment of machine 100. Most image stitching processes require nearly exact overlaps between images and identical exposures to produce seamless results. In order to create a real-time surround-view image, processing device 116 may use a stitching configuration that takes into account the relative position of the actual cameras' viewpoint and maps the displacement of pixels in the different images. The term "stitching configuration" generally refers to a set of rules or parameters used to stitch two (or more) images. For example, a stitching configuration may include an expected overlap area between two images, a selection of a projection surface, a straightening value for each image, and more. The use of predefined stitching configurations shortens the image stitching process and, in some cases, eliminates the steps of detecting and matching key points the image data. One skilled in the art will appreciate that the image data can be stitched before or after the bird's eye view transformation. In some embodiments, virtual features, such as a representation of machine 100, border lines separating regions in the image, and icons representing one or more identified objects, may be overlaid on the penultimate composite images to form the final surround-view image. For example, a representation of machine 100 may be overlaid at a center of the 360-degree surround-view image.

FIGS. 2-4 illustrate different presentations of an exemplary surround-view image that may be shown on display device 114 of machine 100. Specifically, FIG. 2 is a diagrammatic representation of machine 100 before articulation of first section 102, FIG. 3 is a diagrammatic representation of machine 100 after an articulation of first section 102 in a first pivot angle $\theta_1$, and FIG. 4 is a diagrammatic representation of machine 100 after articulation of first section 102 in a second pivot angle $\theta_2$.

As illustrated in FIG. 2, display device 114 may have a screen 200 configured to present a real-time surround-view image of the actual environment around machine 100. The surround-view image may be the result of the bird's eye view transformation and the image stitching process, as described above. Screen 200 shows, at the center of the image, a virtual representation 202 of the articulated truck. Screen 200 may also show sections 1 to 6 that correspond with image data captured by six different cameras 110. The dotted border lines between the numbered sections may represent the stitching lines of the image data captured by the six different cameras 110. The gray area between section 4 and section 5 represents an overlap area 204 between the fields of view of two cameras 100 that correspond with sections 4 and 5. FIG. 2 illustrates an exemplary surround-view image of machine 100 before articulation of first section 102. When machine 100 drives straight, processing device 116 may use a default stitching configuration. The default stitching configuration is defined when the positions of the six different cameras 110 are in their initial arrangements.

FIG. 3 and FIG. 4 illustrate a real-time display of the environment around machine 100 during a turn of machine 100. For simplicity of illustration, FIG. 3 and FIG. 4 depict that only first section 102 turns while second section 104 remains static. Specifically, in FIG. 3 first section 102 is rotated in a first pivot angle $\theta_1$ and in FIG. 4 first section 102 is rotated in a second pivot angle $\theta_2$. As depicted in the figures, the relative positions of cameras 110 in sections 1, 5, and 6 have changed during the turn. As a result the dotted border lines between the sections change and overlap area 204 is gradually reduced. In other words, the changes in the positions of cameras 110 relative to machine 100 (resulted from the change of the pivot angle) affect the overlap areas between the sections. Accordingly, different stitching configurations may be selected and used to account for the changes in the overlap areas in the image data captured by cameras 110.

Figure 5:
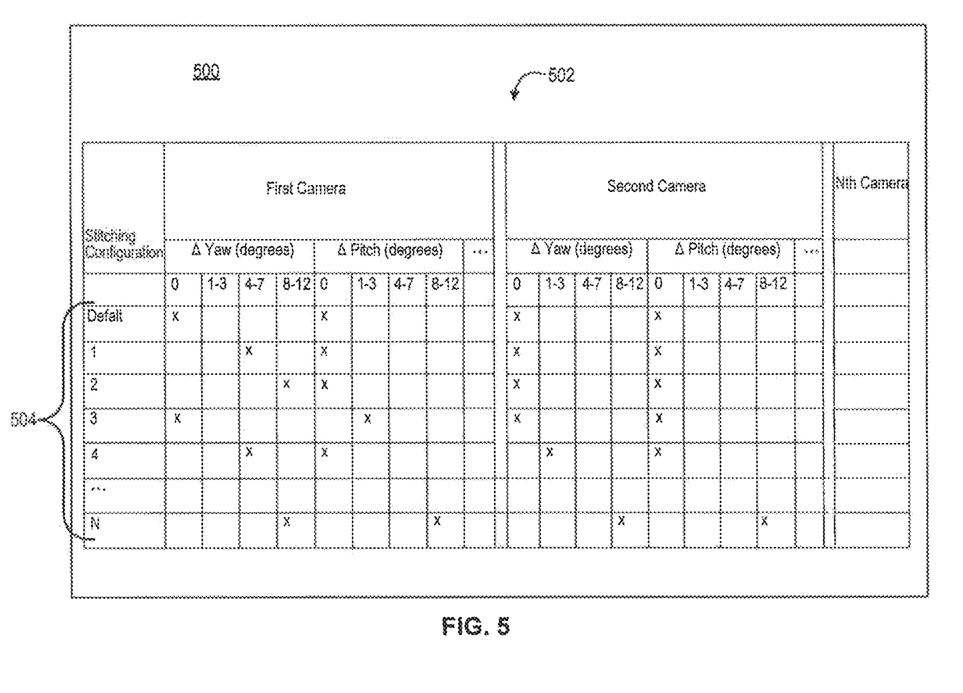
FIG. 5 is a diagrammatic illustration of a data structure storing data related to the relative positions of the cameras mounted on the articulated truck of FIG. 1.

The selection of a stitching configuration is based on information indicative of the current positions of cameras 110. Reference is now made to FIG. 5, which depicts a data structure 500 for storing data related to the relative positions of cameras 110, consistent with disclosed embodiments. As shown in FIG. 5, data structure 500 includes table 502 associating predefined stitching configurations with cameras' positions data. Another possible format of table 502 (not shown) may associate predefined stitching configurations with data regarding the pivot angles between first section 102 and second section 104. In some embodiments, the selected stitching configuration may be, for example, the predefined stitching configuration associated with cameras' positions data that is most similar to the actual current position of cameras 110.

Table 502 is provided for purposes of illustration only and it is partial in several aspects. For example, table 502 may include information regarding all of cameras 110 mounted on machine 100. Also, for each camera 110, table 502 should include additional information, for example, a change in the roll movement, a change in the X-Y-Z movement, indication if the movement change is positive or negative, and more. The ranges of degree change in table 502 (i.e., 1-3, 4-7, and 8-12) are also exemplary and other ranges may be used. Consistent with the present disclosure, table 502 may include a plurality of rotation values associated with a rotation of at least one camera 110 relative to machine 100. The plurality of rotation values may include one or more of the following: a value associated with a horizontal angle of the rotation, a value associated with a vertical angle of the rotation, a value associated with a direction of the rotation, a value associated with a velocity of the rotation, and a value associated with an acceleration of the rotation. In some embodiments, table 502 also includes information from additional sensors that may provide information relevant for stitching image data. For example, table 502 may include information regarding the light intensity in the environment of machine 100, information regarding the engine vibration, and more.

FIG. 5 illustrates a plurality of predefined stitching configurations 504 that may include different predefined stitching configurations for different pivot angles or different positions of cameras 110. In some embodiments, plurality of predefined stitching configurations 504 may include more than 50 predefined stitching configurations, more than 100 predefined stitching configurations, more than 150 predefined stitching configurations, or more than 200 predefined stitching configurations. Processing device 116 is configured to select a stitching configuration associated with the current pivot angle or with the current positions of cameras 110.

The first stitching configuration in table 502 is the default stitching configuration. The default stitching configuration is defined when the cameras 110 are in their initial orientations, i.e., when no change of the relative position is detected. A default stitching configuration may be used when machine 100 is static or driving straight. An example of a situation where the default stitching configuration may be selected is illustrated FIG. 2. Stitching configuration No. 1 is associated with a positive 4-7 degrees yaw change in the first camera, the fifth camera, and the sixth camera (only the first camera is shown in table 502). An example of a situation where the stitching configuration No. 1 may be selected, is illustrated FIG. 3 when the cameras correspond with sections 1, 5, and 6 rotate in a first pivot angle $\theta_1$. Similarly, stitching configuration No. 2 is associated with a positive 8-12 degrees yaw change in the first camera, the fifth camera, and the sixth camera (again, only the first camera is shown in table 502). An example of a situation where the stitching configuration No. 1 may be selected is illustrated FIG. 4 when the cameras corresponding with sections 1, 5, and 6 rotate in a second pivot angle $\theta_2$.

Stitching configuration No. 3 is identical to the default configuration except that the first camera also has a positive 1-3 degrees pitch change. This change may be determined by a built-in sensor 112 that is integral to the first camera. This example represents a drift in the actual position of the first camera relative to machine 100. While this change may be small, it may still have an accumulated effect on the outcome of surround-view image. Accordingly, processing device 116 may select a stitching configuration to account for any drift or change that may happen over time. Specifically, processing device 116 may select stitching configuration No. 3 to take into consideration the positive 1-3 degrees pitch change of the first camera. In addition, processing device 116 may trigger a warning to the operator of machine 100 indicating that the first camera has drifted from its original position. Stitching configuration No. 4 is identical to stitching configuration No. 1 except that the second camera also has a positive 1-3 degrees yaw change. According to some embodiments, processing device 116 may be configured to use the selected stitching configuration to adjust image data captured from multiple cameras (e.g., both the first camera and the second camera).

A detailed explanation of the process of displaying a surround-view image of an environment around an articulated machine using predefined stitching configurations is provided below with reference to FIG. 6.

INDUSTRIAL APPLICABILITY

The disclosed image processing system 108 may be applicable to any machine that uses image stitching process to render a surround-view image on a display. The disclosed image processing system 108 can prevent ghost effects and stitching distortions in the surround-view image that may occur when the actual position of cameras 110 is not taken into account. In particular, the captured image data is adjusted to compensate for a rotation of first section 102 relative to second section 104 and/or a drift in a position of at least one camera 110. Because the disclosed image processing system does not require complicated calculations to select the appropriate stitching configuration, a reliable real-time surround-view image is provided to the operator of machine 100. This real-time surround-view image assists the operator to perform a variety of tasks while monitoring the environment around machine 100.

Figure 6:
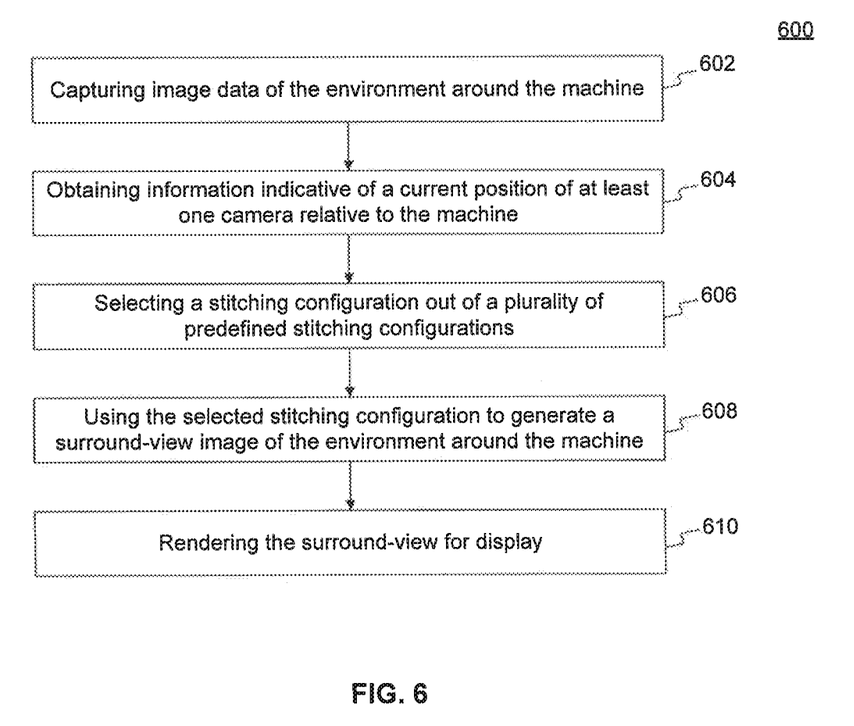
FIG. 6 is a flowchart showing an exemplary process for displaying a surround-view image of an environment around a mobile machine using predefined stitching configurations.

FIG. 6 is a flow chart illustrating an exemplary process 600 for displaying a surround-view image of the environment around machine 100. At block 602, image processing system 108 may use cameras 110 to capture image data of the environment around machine 100. Machine 100 may have first section 102 that includes an operator compartment and is pivotally connected to second section 104 that includes at least one ground engaging element. In some embodiments, at least one camera 110 may be mounted on first section 102. For example, first section 102 may include two, three, or more cameras 110. In other embodiments, at least one camera 110 may be mounted on first section 102 and at least one camera 110 is mounted on second section 104.

At block 604, image processing system 108 may obtain information indicative of a current position of at least one camera 110 relative to machine 100. In some embodiments, image processing system 108 may include sensor 112 that is configured to determine the current position of at least one camera 110 relative to machine 100. In other embodiments, image processing system 108 may include sensor 112 that is configured to measure a pivot angle of first section 102 relative to second section 104. As described above, the current position of at least one camera 110 relative to machine 100 may include the pivot angle of first section 102 relative to second section 104. In addition processing device 116 may determine, from the obtained information, a plurality of rotation values associated with a rotation of at least one camera 110 relative to machine 100. The plurality of rotation values may include two or more of the following: a value associated with a horizontal angle of the rotation, a value associated with a vertical angle of the rotation, a value associated with a direction of the rotation, a value associated with a velocity of the rotation, and a value associated with an acceleration of the rotation.

At block 606, image processing system 108 may select, based on the obtained information, a stitching configuration out of a plurality of predefined stitching configurations. In some embodiments, the obtained information may be indicative of a current position of at least one camera 110 relative to machine 100, and processing device 116 may select a stitching configuration associated with the current position of the at least one camera 110 relative to machine 100. The plurality of predefined stitching configurations may include different stitching configurations for different rotation values. For example, table 502 depicts a plurality of predefined stitching configurations 504 and several examples of predefined stitching configurations associated with different rotation values. In other embodiments, the plurality of predefined stitching configurations may include different predefined stitching configurations for different pivot angles, and processing device 116 may select a stitching configuration associated with the current pivot angle.

At block 608, image processing system 108 may use the selected stitching configuration to generate a surround-view image of the environment around the machine 100. According to the present disclosure, processing device 116 may use the selected stitching configuration to adjust at least part of the image data (e.g., all of the image data) to account for a rotation of first section 102 relative to second section 104. However, in some situations there is no need to adjust the image data from all of cameras 110. For example, in the situation illustrated in FIG. 3, the movement of first section 102 does not require adjustment of the image data captured in section 3. Therefore, in some embodiments, processing device 116 may use the selected stitching configuration to adjust image data captured from a first camera but will avoid adjusting image data captured from a second camera.

At block 610, image processing system 108 may render the surround-view image for display. The surround-view image may include a 360-degree view of the environment around machine 100. In one embodiment a first surround-view image generated by using a first stitching configuration may be distinctive from a second surround-view image generated by using a second stitching configuration. In addition, the processing device 116 is further configured to render the surround-view image on the display in real-time. The term "in real-time" as used herein means without a noticeable delay between the time cameras 110 capture the image data and the time the surround-view image is displayed. For example, the image data may be captured and the surround-view image may be generated continuously and independently to any substantial processing delay. Typically, when machine 100 turns, multiple stitching configurations may be used to account for the continuous changes in the current positions of cameras 110 relative to machine 100.

It will be apparent to those skilled in the art that various modifications and variations can be made to the disclosed image processing system 108. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. An image processing system for a mobile machine, the image processing system comprising:
   a plurality of cameras mounted on the machine and configured to capture image data of an environment around the machine;
   a display mounted on the machine; and
   a processing device in communication with the plurality of cameras and the display, the processing device being configured to:
   obtain sensor information from one or more sensors indicative of a change in a position of at least one camera about an axis of the at least one camera over time from a current position of the at least one camera relative to a point on the machine at which the at least one camera is mounted, wherein the axis is defined through the at least one camera in a fixed position relative to the point on the machine;
   determine from the obtained sensor information a plurality of rotation values associated with a rotation of the at least one camera about the axis of the at least one camera relative to the point on the machine, the plurality of rotation values including two or more of the following: a value associated with a horizontal angle of the rotation, a value associated with a vertical angle of the rotation, a value associated with a direction of the rotation, a value associated with a velocity of the rotation, and a value associated with an acceleration of the rotation;
   based on the obtained sensor information, select a stitching configuration out of a plurality of predefined stitching configurations;
   wherein the plurality of predefined stitching configurations includes different stitching configurations for different rotation values;
   use the selected stitching configuration to generate a surround-view image of the environment around the machine; and
   render the surround-view image on the display.

2. The image processing system of claim 1, wherein the machine has a first section that includes an operator compartment and is pivotally connected to a second section that includes at least one ground engaging element, and wherein at least one of the plurality of cameras is mounted on the first section.

3. The image processing system of claim 2, further comprising at least one sensor configured to measure a pivot angle of the first section relative to the second section, and wherein the current position of the at least one camera relative to the machine includes the pivot angle of the first section relative to the second section.

4. The image processing system of claim 3, wherein the plurality of predefined stitching configurations includes different predefined stitching configurations for different pivot angles, and the processing device is further configured to select a stitching configuration associated with a current pivot angle.

5. The image processing system of claim 4, wherein the processing device is further configured to use the selected stitching configuration to adjust at least part of the image data to account for a rotation of the first section relative to the second section.

6. The image processing system of claim 1, wherein the obtained information is indicative of a current position of at least one of the plurality of cameras relative to the machine, and the processing device is further configured to select a stitching configuration associated with the current position of the at least one of the plurality of cameras relative to the machine.

7. The image processing system of claim 1, wherein the processing device is further configured to use the selected stitching configuration to adjust image data captured from a first camera and to avoid adjusting image data captured from a second camera.

8. The image processing system of claim 1, wherein a first surround-view image generated by using a first stitching configuration is distinctive from a second surround-view image generated by using a second stitching configuration.

9. The image processing system of claim 1, wherein the processing device is further configured to render the surround-view image on the display in real-time.

10. The image processing system of claim 1, wherein the surround-view image includes a 360-degree view of the environment around the machine.

11. A method for displaying a surround-view image of an environment around a mobile machine, the method comprising:
    capturing image data of the environment around the machine;
    obtaining sensor information from one or more sensors indicative of a change in a position of at least one camera about an axis of the at least one camera over time from a current position of the at least one camera relative to a point on the machine at which the at least one camera is mounted, wherein the axis is defined through the at least one camera in a fixed position relative to the point on the machine;
    determining from the obtained sensor information a plurality of rotation values associated with a rotation of the at least one camera about the axis of the at least one camera relative to the point on the machine, the plurality of rotation values including two or more of the following: a value associated with a horizontal angle of the rotation, a value associated with a vertical angle of the rotation, a value associated with a direction of the rotation, a value associated with a velocity of the rotation, and a value associated with an acceleration of the rotation;
    based on the obtained sensor information, selecting a stitching configuration out of a plurality of predefined stitching configurations;
    wherein the plurality of predefined stitching configurations includes different predefined stitching configurations for different rotation values, and the method further includes selecting a stitching configuration associated with a current position of the at least one camera relative to the machine;
    using the selected stitching configuration to generate a surround-view image of the environment around the machine; and
    rendering the surround-view image for display.

12. The method of claim 11, wherein the machine has a first section pivotally connected to a second section and the method further includes measuring a pivot angle of the first section relative to the second section.

13. The method of claim 12, wherein the plurality of predefined stitching configurations includes different predefined stitching configurations for different pivot angles, and the method further includes selecting a stitching configuration associated with the pivot angle of the first section relative to the second section.

14. The method of claim 11, wherein a first surround-view image generated by using a first stitching configuration is distinctive from a second surround-view image generated by using a second stitching configuration.

15. A non-transitory computer programmable medium having executable instructions stored thereon for completing a method for displaying a surround-view image of an environment around a mobile machine, the method comprising:
    capturing image data of the environment around the machine;
    obtaining sensor information from one or more sensors indicative of a change in a position of at least one camera about an axis of the at least one camera over time from a current position of the at least one camera relative to a point on the machine at which the at least one camera is mounted, wherein the axis is defined through the at least one camera in a fixed position relative to the point on the machine;
    determining from the obtained sensor information a plurality of rotation values associated with a rotation of the at least one camera about the axis of the at least one camera relative to the point on the machine, the plurality of rotation values including two or more of the following: a value associated with a horizontal angle of the rotation, a value associated with a vertical angle of the rotation, a value associated with a direction of the rotation, a value associated with a velocity of the rotation, and a value associated with an acceleration of the rotation;
    based on the obtained sensor information, selecting a stitching configuration out of a plurality of predefined stitching configurations;
    wherein the plurality of predefined stitching configurations includes different predefined stitching configurations for different rotation values, and the method further includes selecting a stitching configuration associated with a current position of the at least one camera relative to the machine;
    using the selected stitching configuration to generate a surround-view image of the environment around the machine; and
    rendering the surround-view image for display.

* * * * *